(No Model.) 2 Sheets—Sheet 2.
W. CONN.
BAND CUTTER AND FEEDER FOR THRASHING MACHINES.
No. 487,347. Patented Dec. 6, 1892.
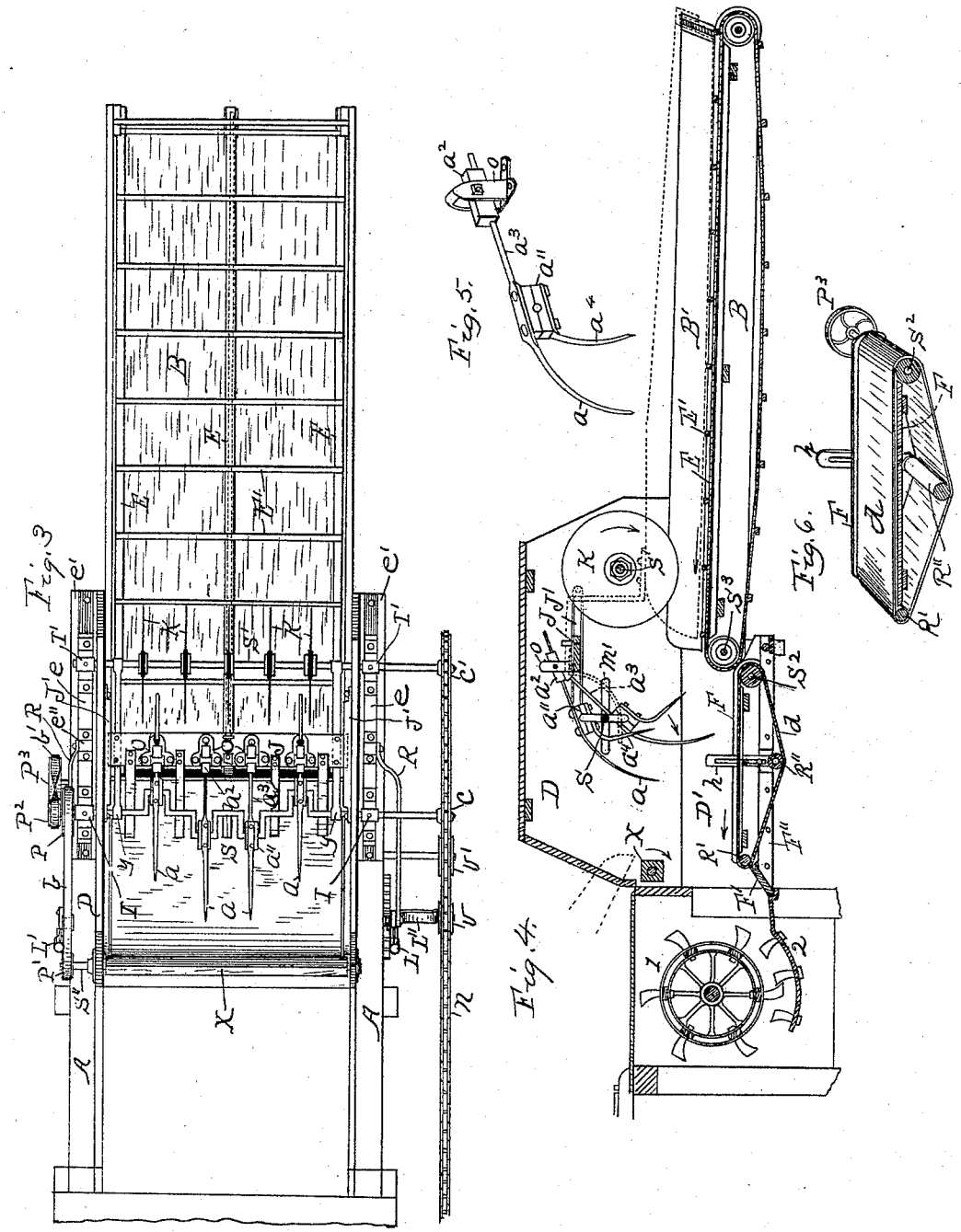
Witnesses,
N B Hagin
W C Hutchins.
Inventor.
William Conn
By Wm J Hutchins
Atty.

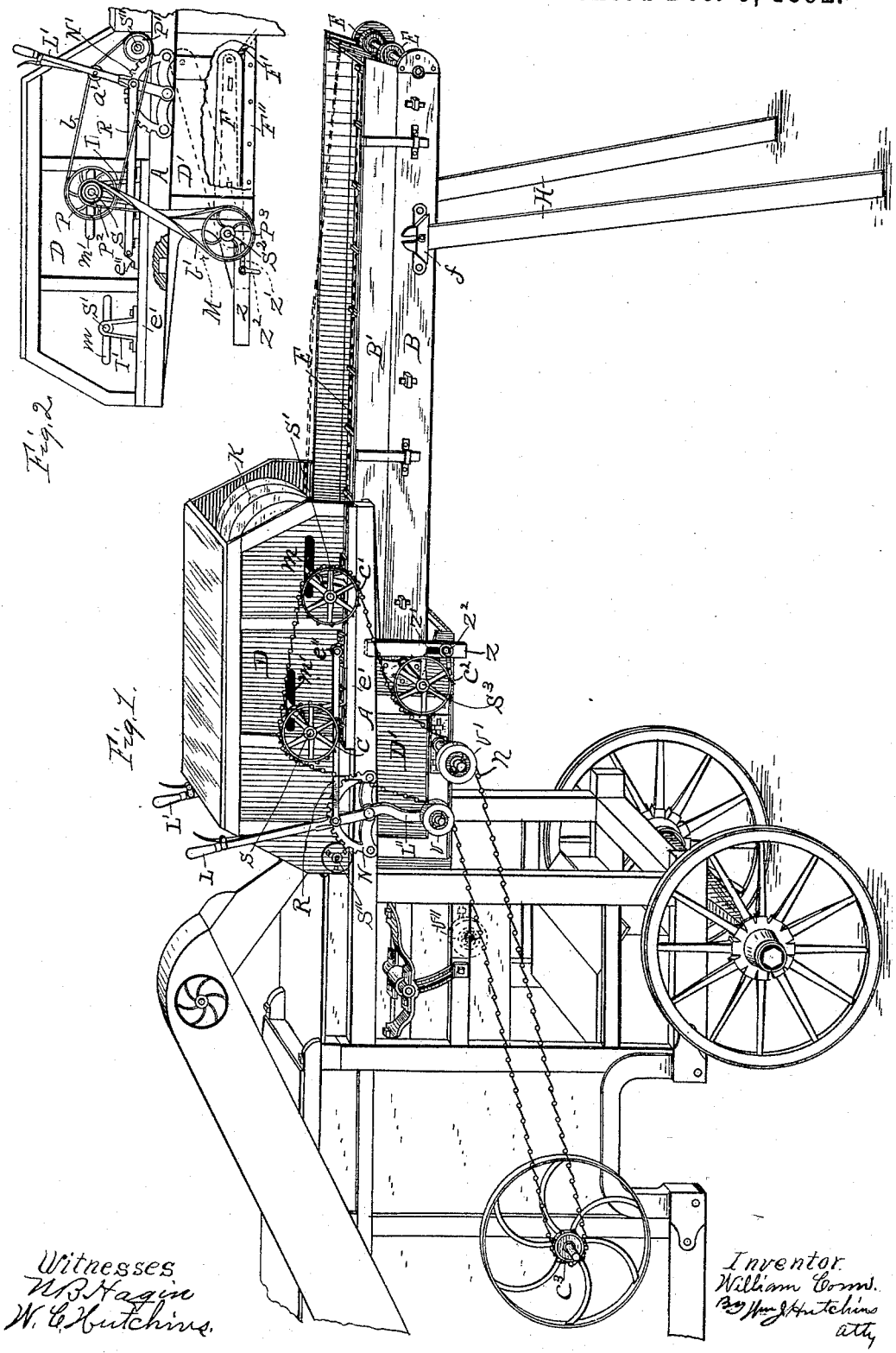

UNITED STATES PATENT OFFICE.

WILLIAM CONN, OF KELLOGG, KANSAS.

BAND-CUTTER AND FEEDER FOR THRASHING-MACHINES.

SPECIFICATION forming part of Letters Patent No. 487,347, dated December 6, 1892.

Application filed February 24, 1891. Serial No. 382,367. (No model.)

*To all whom it may concern:*

Be it known that I, WILLIAM CONN, a citizen of the United States of America, residing at Kellogg, in the county of Cowley and State of Kansas, have invented certain new and useful Improvements in Band-Cutters and Feeders for Thrashing-Machines, of which the following is a specification, reference being had therein to the accompanying drawings, and the letters and figures of reference thereon, forming a part of this specification, in which—

Figure 1 is a perspective elevation of the forward portion of a thrashing-machine having my improved feeder and band-cutter attached thereto. Fig. 2 is a side view of that portion of the feeder and band-cutter adjacent the thrasher and opposite to the side shown in Fig. 1, having the endless carrier detached therefrom and portions broken away to better show its construction. Fig. 3 is a plan of the feeder and band-cutter having its hood removed to better show its plan of construction. Fig. 4 is a vertical longitudinal section of the same. Fig. 5 is a detailed perspective of the picker-finger mechanism of the machine, and Fig. 6 is a similar view of one-half portion of the endless delivery-apron of the machine.

This invention relates to certain improvements in feeders and band-cutters, designed as an attachment to thrashing-machines, which improvements are fully set forth and explained in the following specification and claims.

Referring to the drawings, A A are a pair of arms fixed to the cylinder-housing of the thrashing-machine and extend forward from the thrasher a considerable distance and support thereon the hood D, as shown, and depending from said arms below the sides of the hood are side-boards, (shown at D',) which have cleats F'' secured to their inner lower edge for supporting the frame of an endless carrier-apron and are recessed at their forward end portion, as shown at M in Fig. 2, and B represents the endless carrier-frame, which is formed with its sides rounded at their ends and so constructed as to fit into the recesses M of the side-boards D', as shown in Figs. 1 and 4, and is held thus by means of a pair of bars Z, one on each side, which bars are slotted near one end, as at Z', and are adjustably attached to the forward extension of side-boards D' below the recesses M by means of a bolt passing through these slots and a hand-nut $Z^2$ turned on the bolt and against one of the bars, and are adapted, after the carrier-frame B has been placed, to be adjusted in front of the boxings of the cross-shaft $S^3$ of the carrier, thus assuming a vertical position, and their free ends inserted into a corresponding mortise in the under side of arms A A, and when thus inserted they are locked into such position by tightening the nut $Z^2$, and they thus hold the carrier-frame in such manner that it may be either raised or lowered at its outer end to accommodate all necessary positions, and H represents standards which are forked at their upper end, which forked portions are placed in flared sockets $f$ of the carrier-frame, with a cross-bolt of the sockets resting in their fork, and thus support the outer end of the carrier off the ground, and by inclining said standards, which is permitted by the flaring form of sockets $f$, the outer end of the carrier may be adjusted vertically to assume any position within the limit of such adjustment.

Fixed on the forward cross-shaft $S^3$ of the carrier are three small belt-pulleys, and on the extending end of the shaft is a sprocket-wheel $C^2$, by means of which the shaft is driven, and at the opposite end of the carrier-frame is a similar but idler-shaft having three corresponding pulleys, and about these opposite pulleys are arranged three carrier-belts E, which jointly carry the cross carrier-slats E' and operate up over the carrier-platform toward the thrasher, and B' are a pair of side-boards of the carrier, which are removably attached thereto and extend forward into hood D and prevent grain from falling off after it has been placed on the carrier.

Beneath the hood D and between the side-boards D' is a frame F, similar to carrier-frame B, resting at each side upon the cleats F'' of said sides D', and is provided at one end with a cross-roll fixed on a cross-shaft $S^2$, which shaft has bearings in the side-boards D', and thus pivots that end of said frame F, so that its opposite end may be turned upward, and across the opposite end of said frame is an idler-roll R', and about these rolls is arranged a close endless apron $d$, which is driven by means of a belt-pulley $P^3$, fixed on the end of shaft $S^2$ of said apron-frame, and as a means of tightening said apron, so that it may at all times be taut, a cross idler-roll $R''$ is placed below frame F, which has bearings at its ends in a pair of vertically-adjustable arms $h$, which are slotted and adjustably held attached to the sides of frame F by means of bolts in their slots and may at will be adjusted to regulate the tautness of the apron. This apron $d$ is located so that its upper plane is about level and so arranged as to receive the grain as it is delivered from the carrier B, and adjacent the delivery end of apron $d$ is an inclined cross-board $F'$, which is so arranged as to conduct the grain as it is delivered from apron $d$ to the concave 2 and cylinder 1 of the thrasher, which is commonly known as the "throat" of the thrasher. This board $F'$ is removable, and the purpose of its being removable and the apron-frame F being pivoted so that its end may turn up is to give an operator access to the concave and cylinder of the thrasher.

Fixed on the extending end portion of arms A A is a pair of opposite guideways $e'$, and arranged in these ways is a pair of opposite sliding heads or bars $e$, and mounted upon these bars are the two pairs of opposite standard-boxes I and I', and boxed in the standards I' is a cross-shaft $S'$, passing through slots $m$ of hood D, and has fixed on one end a sprocket-wheel $c'$ in line with the wheel $c^2$ for driving it, and also has fixed thereon within the hood D the series of circular band-cutting disks K, which may have either plain or serrated cutting-edges, and operate above the carrier B to cut the bands of bound grain or masses of entangled grain as it passes into the thrasher, and boxed in standards I is a cross crank-shaft S, passing through slots $m'$ of hood D, which has fixed on one end a sprocket-wheel $c$ in line with the wheels $c'\ c^2$ for driving it and has attached to and operated by its cranks within the hood a series of picker-fingers $a\ a^4$, which fingers are attached to said cranks by means of the boxes $a''$, as shown more clearly in Fig. 5, the fingers $a$ being secured to the top of said boxes and the fingers $a^4$ to the bottom of the same by means of bolts passing through the boxes. Fingers $a$ are provided with a rear-extending arm $a^3$, which are arranged to extend through a guide-hole in a pivotal block $a^2$ in their respective order and govern the movement of the fingers as they are given movement by the cranks. Said blocks $a^2$ are pivotally supported by means of standard-bearings $o$, which are fixed to a cross-board J within hood D above and between the cross-shafts S S', and each end of said cross-board rests in guideways J', which ways are fixed to the sides of hood D, and $y\ y$ are arms boxed at each end respectively to the cross-shafts S and S' and are bolted near their center to cross-board J in such manner that when said shafts are moved either toward or from the thrasher said board J will be likewise moved, and the purpose of constructing the standard-boxes I and I' and connecting them to the sliding bars $e$ and also in connecting the cross-board J with the cross-shafts supported by said standard-boxes is so that all of said parts and the parts carried and operated by them may be jointly moved toward or from the throat of the thrasher to accommodate them to and adapt the machine to either long or short straw, and the purpose of the picker-fingers is to engage and evenly distribute the grain when in bundles or masses upon the apron $d$, so that it will be evenly fed into the thrasher and not in bunches, as would be the case were not such means employed, and $x$ is a cross-beater arranged across the lower portion of hood D above the delivery end of apron $d$ for the purpose of assisting in directing the course of the grain into the thrasher-throat and has a shaft boxed in bearings in the sides of the hood and is driven by means of a pulley $P'$, fixed on the extending end of its said shaft $S''$.

L and L' are a pair of opposite hand-levers fulcrumed to the sides of arms A A adjacent the thrasher, and are each provided with a hand-latch mechanism and a notched segment N, which segments are fixed to said arms A and serve to hold the levers adjusted through the agency of said latch mechanism, and each lever is connected with the sliding bar $e$ at its side of the machine by means of a connecting-bar R through the agency of a block $e''$, fixed to the bar $e$ in such manner that by operating said levers jointly said bars $e$ will be moved, and thereby move the picker-finger mechanism and band-cutters within the hood. Lever L terminates at its lower end with an outwardly-extending arm $L''$, which has studded thereto an idler sheave-wheel V in line with the former-described sprocket-wheels, and adjustably studded to the side of one side-board D' is a similar idler sheave-wheel $o'$, in line with wheel V and the former-described sprocket-wheels, and about these sprocket-wheels $c$, $c'$, and $c^2$ and the idlers $v\ v'$ is arranged a drive chain belt $n$, leading from and about a driven sprocket-wheel $c^3$ of the thrasher, as shown in Fig. 1, and thus by means of said chain motion is imparted to the feeding and band-cutting mechanism. The idler $v'$ is for the purpose of holding the chain $n$ down upon wheel $c^2$, so that it will properly drive the carrier-belts E, and the purpose of idler $v$ is to automatically move when the lever L is operated to let out or take up the slack of belt $n$ when the feeding and cutting mechanism is moved, as described, so that said belt will at all times have proper tension. The dotted lines shown at $v''$ in Fig. 1 represent a similar idler studded to the thrasher, and if it is so desired the belt $n$ may be placed under said idler and the lever idler $v$ be dispensed with, and under such circumstances when adjustment is made to move the operative parts, as described, sections of the chain of belt $n$ may be removed or added to adapt the belt suitable to the adjustment. At the opposite side of hood D the crank-shaft S is provided with a belt-pulley P, which drives the beater-shaft pulley P' through the agency of a belt b, and also with a pulley P², which drives the endless apron-pulley P³ through the agency of a belt b', and fixed on a stud at the side of lever L' is an idler-pulley a', arranged under belt b, and is for the purpose of letting out or taking up the slack of said belt when adjustment of parts is made by the levers, as before described, so that the belt will at all times have proper tension.

The endless apron d is so speeded that it has about one-half the speed of the carrier-belts E, and therefore does not move the grain so fast but what the picker-fingers can accomplish their purpose, and one principal feature or purpose of said apron is to prevent the grain clogging at the delivery of carrier B and to deliver the tailings, which are delivered upon it, from the tailings-elevator spout above into the throat of the thrasher, and thereby constantly keep the way to the throat of the thrasher clear from all obstacles.

In operation the bundles of grain are pitched upon carrier B, and are carried along by the carrier-slats E', and as they come under cutters K said cutters cut their bands, and finally they are delivered upon apron d, where they are engaged by the picker-fingers, and it will be observed that the cranks operating the picker-fingers are so formed that the two opposite ones are of like throw and the two center ones also of like but opposite throw to the side ones, and thus when operated the two side fingers come down and engage the bundles which may be under them, but not the center bundles, and distribute them while the center fingers are moving up about on their circuit, and thus but one-half of the feeding grain is distributed at one time, and by reason of the cranks being formed on the half-throw and not quartering, as is usual, the distributing is taking place but one-half the time, and the action of the picker-fingers in distributing is to push the uppermost part of a bundle into the thrasher-throat, and when such is done move up free from the grain and permit the apron d to gradually feed the remainder of grain of the bundle to the thrasher-throat, and by such action a perfectly even and regular feed is made, and it is essential that as the uppermost portion of a bundle is started into the thrasher by the picker-fingers that at that instant the fingers should move up from the grain, and to insure such action it becomes necessary to adjust said picker-finger mechanism and band-cutters to accommodate different lengths of straw. For short straw they are moved toward the thrasher and for long straw from the thrasher.

In the drawings I have represented by dotted lines a divider-board centrally located between the sides of the extending bundle-carrier and immediately above the carrier-slats, which may at times when feeding straight and uniform bundles be used, which will prevent the bundles from lying crosswise on the carrier. I have also shown by dotted lines fender-arms extending downwardly and forwardly between the picker-fingers, which will serve to prevent loose grain or the straw thereof from becoming tangled with the crank-shaft of the picker-fingers.

Having thus described my invention, what I claim as new and useful, and desire to secure by Letters Patent, is as follows:

1. A feeder and band-cutter for thrashing-machines, consisting of the combination, with the arms A A, the hood D, and side-boards D', of the carrier-frame B, held in end recesses of said side-boards by means of the adjustable bars Z, and provided with the endless slatted carrier-belts E, and shafts and pulleys for operating said belts of the endless apron d, supported by the pivoted frame F, resting on cleats between said side-boards D' for receiving grain from the carrier and delivering it to thrasher-cylinder, the guideways e', fixed upon the arms A, the sliding bars e, arranged in said ways, the standard-boxes I and I', fixed to and carried by said sliding bars, the picker-finger and band-cutting mechanism supported by said standard-boxes, the lever mechanism for adjusting said picker-finger and band-cutting mechanism, and the belt-wheels and belts for operating the several parts of the machine, substantially as and for the purpose set forth.

2. The combination, with the endless carrier B and apron d, of the picker-finger and cutter mechanism supported and operated by the shafts S S' above said carrier and apron, the standard-boxes jointly supported and carried by the sliding bars and supporting and carrying said shafts therewith, and the lever and connecting-rod mechanism for adjusting said picker-finger and cutter mechanism, substantially as and for the purpose set forth.

3. The combination, with the driven crank-shaft S, of the boxes a'' on the cranks of said shaft, the picker-fingers $a^4$, fixed to the under side of and extending downward from said boxes, the picker-fingers a, oppositely fixed to said boxes and extending forward and downward therefrom in line with the fingers $a^4$ and provided with the rear-extending arms $a^3$ of the cross-board J, provided with the standards o, and the blocks $a^2$, pivotally supported by said standards and chambered to receive said extending arms $a^3$ of the picker-fingers for governing the movement of said fingers, substantially as set forth.

4. The combination, with the belt-driving mechanism and the band-cutting and picker-finger and connected lever mechanism, of the idler-pulleys fixed to and carried by the said adjusting-levers of the machine for taking up or letting out the slack of the belts when the levers are adjusted, substantially as set forth.

5. A feeder and band-cutter for thrashing-machines, provided with a series of picker-fingers operated by cranks and a series of rotary band-cutters jointly supported on and carried by means of sliding bars or heads and with adjusting-levers for moving said finger and cutting mechanism toward or from the thrasher-throat for adapting the machine to grain having straw of different lengths, substantially as set forth.

WILLIAM CONN.

Witnesses:
S. T. CASE,
GEO. WILSON.